United States Patent
Ye

(10) Patent No.: US 10,860,155 B2
(45) Date of Patent: Dec. 8, 2020

(54) TOUCH SENSOR AND DISPLAY DEVICE

(71) Applicant: Wuhan China Star Optoelectronics Semiconductor Display Technology Co., Ltd., Wuhan (CN)

(72) Inventor: Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 48 days.

(21) Appl. No.: 16/475,690

(22) PCT Filed: Apr. 10, 2019

(86) PCT No.: PCT/CN2019/082122
§ 371 (c)(1),
(2) Date: Jul. 3, 2019

(87) PCT Pub. No.: WO2020/172956
PCT Pub. Date: Sep. 3, 2020

(65) Prior Publication Data
US 2020/0301546 A1    Sep. 24, 2020

(30) Foreign Application Priority Data
Feb. 28, 2019   (CN) .......................... 2019 1 0148204

(51) Int. Cl.
*G06F 3/041* (2006.01)
*G06F 3/044* (2006.01)

(52) U.S. Cl.
CPC .......... *G06F 3/0446* (2019.05); *G06F 3/0447* (2019.05); *G06F 2203/04111* (2013.01)

(58) Field of Classification Search
CPC ............................................... G06F 3/041–047
See application file for complete search history.

(56) References Cited

U.S. PATENT DOCUMENTS

| | | | |
|---|---|---|---|
| 9,360,972 B1* | 6/2016 | Avery | G06F 12/0207 |
| 2008/0048989 A1 | 2/2008 | Yoon et al. | |
| 2016/0188039 A1* | 6/2016 | Yoon | G06F 3/0414 345/174 |
| 2017/0031509 A1* | 2/2017 | Yoon | G06F 3/047 |
| 2019/0339817 A1* | 11/2019 | Kim | G06F 3/0446 |
| 2020/0218384 A1* | 7/2020 | Guo | G06F 3/047 |

FOREIGN PATENT DOCUMENTS

| | | |
|---|---|---|
| CN | 106249960 | 12/2016 |
| CN | 106325622 | 1/2017 |
| CN | 109144330 | 1/2019 |

* cited by examiner

*Primary Examiner* — Roy P Rabindranath

(57) ABSTRACT

A touch sensor and a display device are provided, which include a first touch electrode and a second touch electrode, wherein a border area of the first touch electrode is provided with at least one suspension electrode, and a border area of the second touch electrode is provided with at least one suspension electrode, and the suspension electrodes on the adjacent first touch electrode and second touch electrode are connected by a connecting bridge. Such a touch sensor can realize the sensing of the touch intensity and simplify the production process, thereby saving the production cost of the product.

20 Claims, 6 Drawing Sheets

TOUCH SENSOR AND DISPLAY DEVICE

RELATED APPLICATIONS

This application is a National Phase of PCT Patent Application No. PCT/CN2019/082122 having International filing date of Apr. 10, 2019, which claims the benefit of priority of Chinese Patent Application No. 201910148204.2 filed on Feb. 28, 2019. The contents of the above applications are all incorporated by reference as if fully set forth herein in their entirety.

FIELD AND BACKGROUND OF THE INVENTION

The present disclosure relates to a field of display technologies, and in particular, to a touch sensor and a display device.

In recent years, with improvement and rapid development of touch and sensing technology, touch technology has been widely used in electronic display devices, such as mobile phones and computers. Currently, common touch technologies include a resistance type, a capacitance type, an optical type, and the like.

At present, capacitance type touch screens have become the mainstream of touch screens, the capacitance type touch screens have advantages of low cost, simple structures, and durability, and are widely used by intelligent terminals and display devices. However, most electrode patterns of current capacitance type touch screens can only sense a touch position of a plane, that is, a position of the X/Y axis in a two-dimensional space, and a touch force of fingers cannot be sensed, so that the force and a force degree of the fingers on the touch screen cannot be recognized. There is also a touch screen module that perceives the Z-axis direction, but a pressure sensing function of this part of the touch screen is usually controlled by a pressure sensor independent of the traditional touch screen, so the pressure sensor needs to be added separately on the display, which complicates the production process and increases production costs.

Therefore, it is necessary to propose solutions to the problems in current technology.

Technical Problem

Current touch sensors and the display devices have the problem of only sensing the touch of the plane, and cannot sense the touch force. Moreover, there is a need to separately add a pressure sensor to the touch screen mechanism to sense the touch force. The production process is complicated and the cost is high.

SUMMARY OF THE INVENTION

Technical Solution

In order to solve the above problems, the present disclosure provides a touch sensor and a display device. The technical solution provided by the present disclosure is as follows.

According to a first aspect of the embodiments of the present disclosure, a touch sensor is provided, and the touch sensor includes:

a plurality of first touch electrodes;

a plurality of second touch electrodes insulated from the plurality of first touch electrodes;

wherein the touch sensor further comprises at least one first suspension electrode disposed at a border area of each of the first touch electrodes where the first suspension electrode is coupled to one of the first touch electrodes to form a capacitor for sensing pressure, at least one second suspension electrode disposed at a border area of each of the second touch electrodes where the second suspension electrode is adjacent to the first suspension electrode and the second suspension electrode is coupled to one of the second touch electrodes to form a capacitor for sensing pressure, wherein the touch sensor further comprises a first connecting bridge and a second connecting bridge, the first suspension electrode on the first touch electrode is connected to the first suspension electrode on the adjacent first touch electrode through the first connecting bridge; the adjacent first suspension electrodes are electrically connected through the first connecting bridge and the adjacent second suspension electrodes are electrically connected through the second connecting bridge.

According to an embodiment of the present disclosure, each of the first touch electrodes is disposed along a first direction, each of the second touch electrodes is disposed along a second direction, and the first direction and the second direction are different.

According to an embodiment of the present disclosure, further comprises a first conductive bridge and a second conductive bridge, wherein the adjacent first touch electrodes are connected by the first conductive bridge, and the adjacent second touch electrodes are connected by the second conductive bridge, and the first conductive bridge and the second conductive bridge overlap each other to form an overlapping area.

According to an embodiment of the present disclosure, a material of the connecting bridge is metal.

According to an embodiment of the present disclosure, an end of the first connecting bridge and an end of the second connecting bridge are T-shaped or Y-shaped.

According to an embodiment of the present disclosure, the first suspension electrode comprises a plurality of first split electrodes, and the second suspension electrode comprises a plurality of second split electrodes.

According to a second aspect of the embodiments of the present disclosure, a touch sensor is provided, and the touch sensor includes:

a plurality of first touch electrodes;

a plurality of second touch electrodes insulated from the plurality of first touch electrodes;

wherein the touch sensor further comprises at least one first suspension electrode disposed at a border area of each of the first touch electrodes where the first suspension electrode is coupled to one of the first touch electrodes to form a capacitor for pressure sensing, at least one second suspension electrode disposed at a border area of each of the second touch electrodes where the second suspension electrode is adjacent to the first suspension electrode and the second suspension electrode is coupled to one of the second touch electrodes to form a capacitor for pressure sensing, and the adjacent first suspension electrodes are electrically connected through a first connecting bridge and the adjacent second suspension electrodes are electrically connected through a second connecting bridge.

According to an embodiment of the present disclosure, each of the first touch electrodes is disposed along a first direction, each of the second touch electrodes is disposed along a second direction, and the first direction and the second direction are different.

According to an embodiment of the present disclosure, further comprises a first conductive bridge and a second conductive bridge, wherein the adjacent first touch electrodes are connected by the first conductive bridge, and the adjacent second touch electrodes are connected by the second conductive bridge, and the first conductive bridge and the second conductive bridge overlap each other to form an overlapping area.

According to an embodiment of the present disclosure, further comprises a first connecting bridge and a second connecting bridge, wherein the first suspension electrode on the first touch electrode is connected to the first suspension electrode on the adjacent first touch electrode through the first connecting bridge, and the second suspension electrode on the first touch electrode is connected to the second suspension electrode on the adjacent first touch electrode through the second connecting bridge.

According to an embodiment of the present disclosure, an end of the first connecting bridge and an end of the second connecting bridge are T-shaped or Y-shaped.

According to an embodiment of the present disclosure, the first suspension electrode comprises a plurality of first split electrodes, and the second suspension electrode comprises a plurality of second split electrodes.

According to an embodiment of the present disclosure, a plurality of first split electrodes are disposed at a border area of each of the first touch electrodes, and a plurality of second split electrodes are disposed at a border area of the second touch electrode.

According to an embodiment of the present disclosure, a plurality of first split electrodes coincide with the first suspension electrode in a top view, and a plurality of second split electrodes coincide with the second suspension electrode in a top view.

According to an embodiment of the present disclosure, further comprising a connecting bridge, each of the first split electrodes of the border area of the first touch electrode is connected by the connecting bridge.

According to an embodiment of the present disclosure, further comprises at least one split electrode, and an area between each of the first touch electrodes and each of the second touch electrodes is provided with the split electrode.

According to an embodiment of the present disclosure, the overlapping area has an insulating medium, and the first conductive bridge and the second conductive bridge are insulated.

According to an embodiment of the present disclosure, a material of the connecting bridge is metal.

According to a third aspect of the embodiments of the present disclosure, a display device is provided, and the display device includes:

a plurality of first touch electrodes;

a plurality of second touch electrodes insulated from the plurality of first touch electrodes;

wherein the touch sensor further comprises at least one first suspension electrode disposed at a border area of each of the first touch electrodes where the first suspension electrode is coupled to one of the first touch electrodes to form a capacitor for pressure sensing, at least one second suspension electrode disposed at a border area of each of the second touch electrodes where the second suspension electrode is adjacent to the first suspension electrode and the second suspension electrode is coupled to one of the second touch electrodes to form a capacitor for pressure sensing, wherein the adjacent first suspension electrodes are electrically connected through a first connecting bridge and the adjacent second suspension electrodes are electrically connected through a second connecting bridge.

Beneficial Effect

The embodiment of the present disclosure provides a touch sensor and a display device, which are improved on a current capacitance type touch screen. By setting a suspension electrode and a split electrode on the touch screen to solve the problem of the touch screen in the current technology can only perceive the contact condition of a plane and cannot perceive a size of a touch force. This realizes the pressure sensing function of the touch screen and simplifies the production process and saves the production cost of the product.

DESCRIPTION OF SPECIFIC EMBODIMENTS OF THE INVENTION

Best Mode for Carrying Out the Invention

The following description of the various embodiments referring with additional diagram is provided to illustrate particular embodiments that may be implemented in accordance with the present disclosure.

Figure 1:
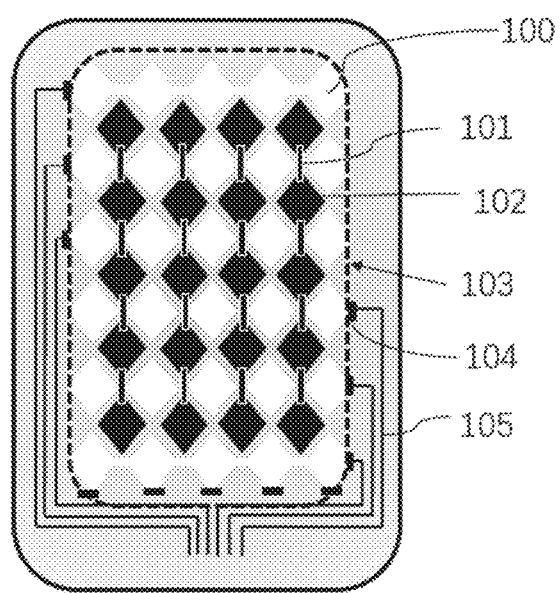
FIG. 1 is a schematic diagram of a design of a touch screen electrode pattern according to an embodiment of the present disclosure.

The present disclosure provides a touch sensor. As shown in FIG. 1, FIG. 1 is a schematic diagram of a design of a touch electrode pattern according to the disclosure, which shows at least one horizontally continuous sensing channel (Receive, RX) 100, at least one conductive bridge 101, at least one longitudinally continuous driving channel (Transmit, TX) 102, a visible area (VA) 103 of a touch screen, at least one lap joint area 104, and a peripheral metal trace 105. The sensing channel 100 and the driving channel 102 are disposed in the visible area 103 of the touch screen, the lap joint area 104 is disposed at an outer edge of the visible area 103, and the peripheral metal trace 105 is also disposed at the outer edge of the visible area 103. When the display screen is working, the touch screen visible area 103 is the main working area. Through the finger in the visual area 103 of sliding, pressing, and other operations, the different functions of the touch screen can be realized by the longitudinally continuous driving channel 102 which is electrically connected by connections of the conductive bridges 101. Wherein RX and TX are relative to each other, the relative positions are interchangeable, and are adhered to an upper surface of the visible area 103. Materials of the two may be indium tin oxide (ITO) electrodes, or both are metals, such as Ti and Al. The electrode is formed with a mesh structure, the wiring of the metal mesh avoids a pixel light emitting unit below, and a metal bridge is also a mesh wiring, so that a lower light emitting pixel unit is not blocked. The touch electrode provided by the present disclosure can realize not only a planar touch function but also a function of sensing magnitude of a force in the vertical direction without separately adding a pressure sensing device.

Figure 2:
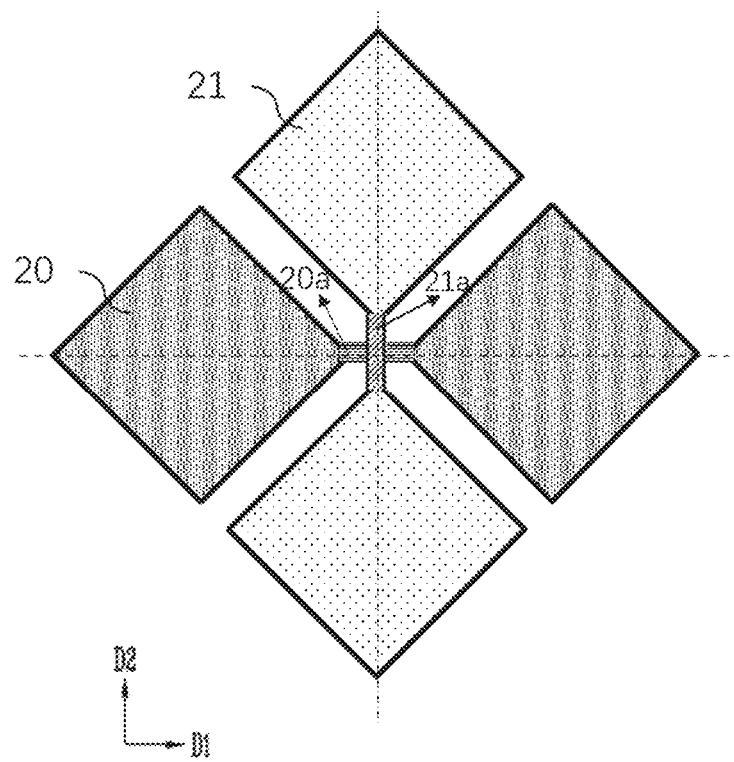
FIG. 2 is a schematic diagram of a touch electrode according to an embodiment of the present disclosure.

As shown in FIG. 2, FIG. 2 is a schematic diagram of a touch electrode according to an embodiment of the present disclosure, including at least one first touch electrode 20, a first conductive bridge 20a, at least one second touch electrode 21, a second conductive bridge 21a, a direction D1, and a direction D2. In the figure, the touch electrode is provided with a plurality of first touch electrodes 20 in the direction D1 and a plurality of second touch electrodes 21 in the direction D2. The direction D1 is different from the direction D2, for example, the direction D1 and the direction D2 are perpendicular to each other. Each two adjacent first touch electrodes 20 are connected by a first conductive bridge 20a, each two adjacent second touch electrodes 21 are connected by a second conductive bridge 21a, and an overlapping area is formed between the first conductive bridge 20a and the second conductive bridge 21a. The overlapping area also has an insulating layer, so that the first conductive bridge 20a and the second conductive bridge 21a are insulated to ensure independence between RX and TX during normal operation.

Figure 3A:
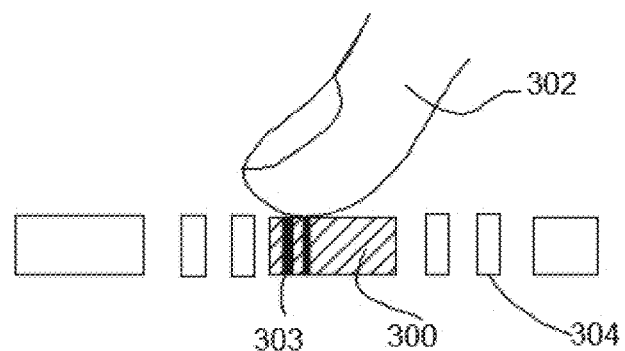
FIG. 3A is a schematic diagram of a first type touch screen.
Figure 3B:
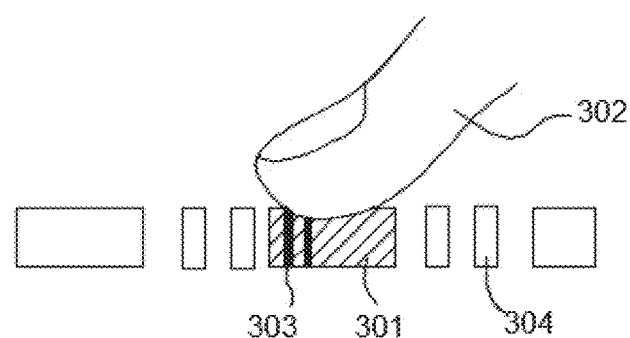
FIG. 3B is a schematic diagram of a second type touch screen.

As shown in FIG. 3A, FIG. 3A is a schematic diagram of a first type touch screen and FIG. 3B is a schematic diagram of a second type touch screen, which shows a first touch electrode 300, a second touch electrode 301, a touch finger 302, a plurality of suspension electrodes 303, and a plurality of split electrodes 304. The plurality of suspension electrodes 303 are disposed on a border area of the first touch electrode 300 or a border area of the second touch electrode 301. The plurality of suspension electrodes 303 are coupled to the first touch electrode 300 to form a capacitor for sensing pressure to detect magnitude of the touch forces. FIG. 3A shows a situation when the finger 302 is just touching, at which time the force is lighter and the contact area with the screen is smaller. FIG. 3B shows a situation when the finger 302 is strongly touched. At this point, the finger force is greater, and the touch finger 302 has a large contact area with the touch screen. The greater force the touch screen is subjected to, the deeper the depth of the screen will sink. The change in force and the change in the area and position of the finger touched are transmitted to the plurality of suspension electrodes 303 and the plurality of split electrodes 304 disposed on the touch electrode, and then converted into signal input or output, thereby implementing the touch function of the screen.

Figure 4:
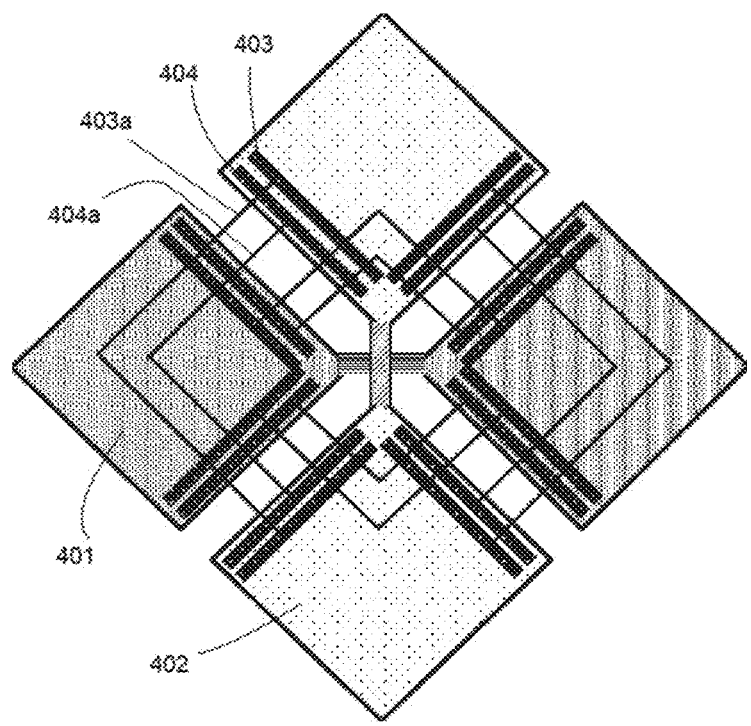
FIG. 4 is a schematic diagram of a touch electrode according to a first embodiment of the present disclosure.

Specifically, as shown in FIG. 4, FIG. 4 is a schematic diagram of a touch electrode according to an embodiment of the disclosure, which shows at least one first touch electrode 401, at least one second touch electrode 402, a plurality of first suspension electrodes 403, a plurality of second suspension electrodes 404, a plurality of first connecting bridges 403a, and a plurality of second connecting bridges 404a. The first suspension electrode 403 and the second suspension electrode 404 are disposed on each of the first touch electrodes 401 and each of the second touch electrodes 402. The first suspension electrode 403 is closer to the edge position of the first touch electrode 401. The first suspension electrode and the second suspension electrode on each touch electrode are connected by a corresponding connecting bridge, that is, the first suspension electrode 403 on the two adjacent first touch electrodes 401 is connected through the first connecting bridge 403a, so as to form a complete function of an electrode. A second suspension electrode 404 is disposed adjacent to the first suspension electrode 403, and the second suspension electrode 404 can be coupled with the second touch electrode 402 to form a capacitor for sensing pressure. The connecting bridge is metal and externally insulated to avoid a short circuit with the touch electrode. The electrode pattern constitutes a structure in which a plurality of sets of first suspension electrodes are connected and a plurality of sets of second suspension electrodes are connected, and the suspension electrode can sense the magnitude of the force and convert it into an electrical signal for transmission. On a connection point between the connecting bridge and the suspension electrode, it can be set into a T-shaped or Y-shaped structure, which can increase the area of the touch, thereby improving the reliability of the sensing, and also increasing a sensing amount of the capacitance signal. In turn, the sensitivity of sensing is improved.

Figure 5:
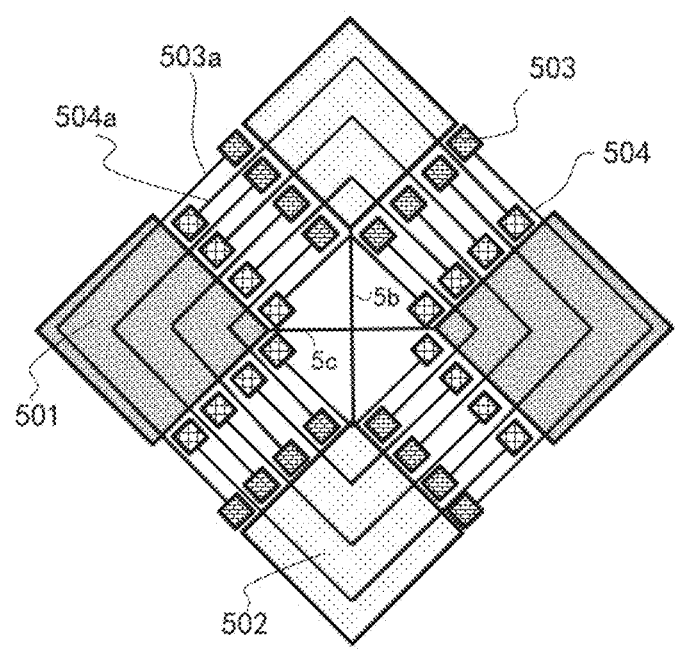
FIG. 5 is a schematic diagram of a touch electrode according to a second embodiment of the present disclosure.

As shown in FIG. 5, FIG. 5 is a schematic diagram of another touch electrode according to an embodiment of the disclosure, which showing at least one first touch electrode 501, at least one second touch electrode 502, a plurality of second split electrodes 503, a plurality of first split electrodes 504, a plurality of second connecting bridges 503a, a plurality of first connecting bridges 504a, at least one first conductive bridge 5c, and at least one second conductive bridge 5b. Relative to a single piece of the suspension electrode, at this point, the touch electrode is set to a plurality of split electrodes. A plurality of first split electrodes 504 are disposed outside the border area of the first touch electrode 501, and the plurality of first split electrodes 504 are arranged side by side. A plurality of second split electrodes 503 are disposed outside the border area of the second touch electrode 502, and the plurality of second split electrodes 503 are also disposed side by side, with at least one row. The split electrodes on the adjacent first touch electrode 501 and the second touch electrode 502 are connected by a corresponding connecting bridge, that is, the first split electrode 504 on the first touch electrode 501 is respectively connected to the first split electrode 504 on the adjacent first touch electrode 501 through the first connecting bridge 504a and the second split electrodes 503 on the adjacent second touch electrode 502 are respectively connected by the second connecting bridge 503a. At this point, a plurality of side-by-side split electrodes are disposed outside the border area of touch electrode.

Figure 6:
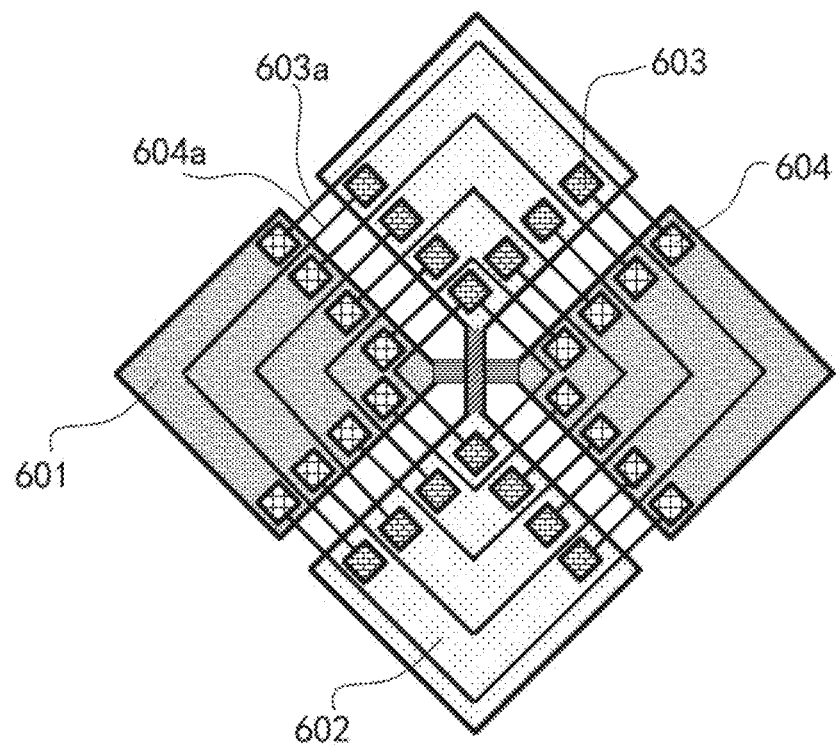
FIG. 6 is a schematic diagram of a touch electrode according to a third embodiment of the present disclosure.

As shown in FIG. 6, FIG. 6 is a schematic diagram of another touch electrode according to an embodiment of the disclosure, which shows at least one first touch electrode 601, at least one second touch electrode 602, a plurality of second split electrodes 603, a plurality of first split electrodes 604, a plurality of first connecting bridges 603a, and a plurality of second connecting bridges 604a. Meanwhile, a plurality of split electrodes are disposed on each touch electrode, wherein the split electrodes are arranged side by side and the plurality of split electrodes are disposed within the border area of the touch electrode, that is, the plurality of split electrodes are disposed in inside of each TX or in inside of each RX, as in the border area of each of the first touch electrode 601 and the second touch electrode 602 shown in FIG. 6. When the finger touches the screen, the plurality of split electrodes distributed on the touch electrode sense the magnitude of the touch force, and convert the information, such as the touch force and the position, into an electrical signal for transmission.

Figure 7:
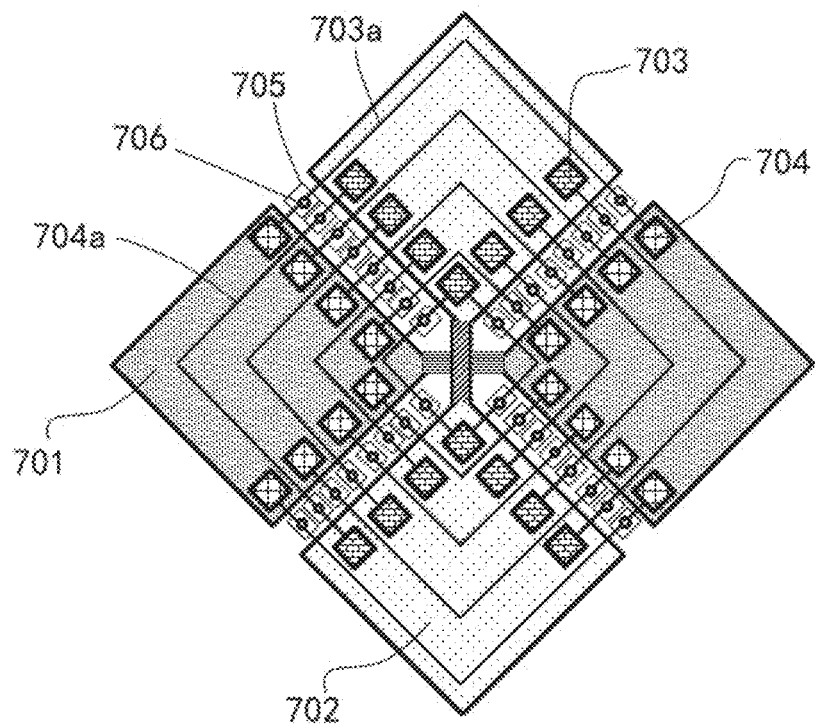
FIG. 7 is a schematic diagram of a touch electrode according to a fourth embodiment of the present disclosure.

FIG. 7 is a schematic diagram of another touch electrode according to an embodiment of the disclosure, which shows at least one first touch electrode 701, at least one second touch electrode 702, a plurality of first split electrodes 704, a plurality of second split electrodes 703, a plurality of suspension electrodes 705, a plurality of nodes 706, a plurality of first connecting bridges 703a, and a plurality of second connecting bridges 704a. At this point, the plurality of first split electrodes 704 are disposed in the border area of the first touch electrode 701, and the plurality of second split electrodes 703 are arranged side by side in the border area of the second touch electrode 702, and at the same time, outside the border area of the first touch electrode 701 and the second touch electrode 702, that is, the plurality of suspension electrodes 705 are arranged on the interval between TX and RX, and the plurality of suspension electrodes 705 are arranged in a row. The first split electrodes 704 on the two adjacent first touch electrodes 701 are correspondingly connected by the first connecting bridge 703a, and the first connecting bridge 703a connects the corresponding suspension electrodes 705 through each node 706. The setup suspension electrode 705 and the split electrode cooperate to sense the force on the touch screen and the forced area and then transmit the signal, which enable the accuracy and sensitivity of touch and sensing is effectively improved.

Figure 8:
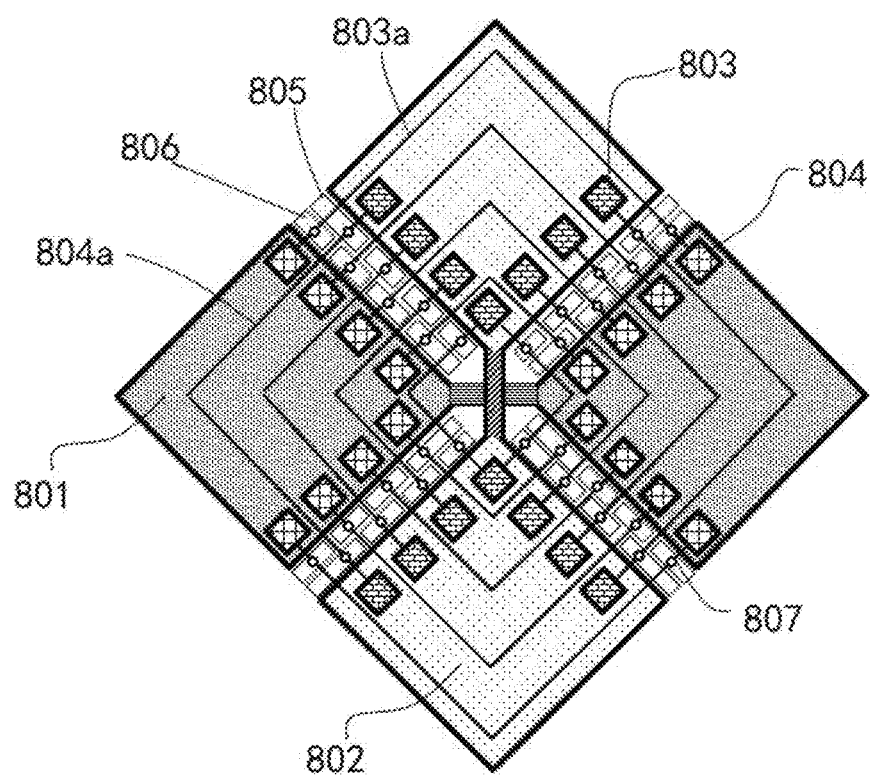
FIG. 8 is a schematic diagram of a touch electrode according to a fifth embodiment of the present disclosure.

As shown in FIG. 8, FIG. 8 is a schematic diagram of another touch electrode according to an embodiment of the disclosure, which shows at least one first touch electrode 801, at least one second touch electrode 802, a plurality of first split electrodes 804, a plurality of second split electrodes 803, a plurality of second suspension electrodes 805, a plurality of first suspension electrodes 806, a plurality of first connecting bridges 803a, a plurality of second connecting bridges 804a, and a plurality of nodes 807. The first split electrode 804 can coincide with the first suspension electrode 806 in a top view when the setting is made, and the second split electrode 803 can coincide with the second suspension electrode 805 in a top view. At this point, compared with the embodiment in FIG. 7, at least one row of suspension electrodes, that is, the first suspension electrode 806 and the second suspension electrode 805, are disposed outside the border area, and the first connecting bridge 803a connects the first split electrode 804 on the adjacent touch electrode and connects the corresponding first suspension electrode 806 through the node 807. In this way, the touch sensing of the screen is further improved, and the touch precision and touch sensitivity are further improved.

Figure 9:
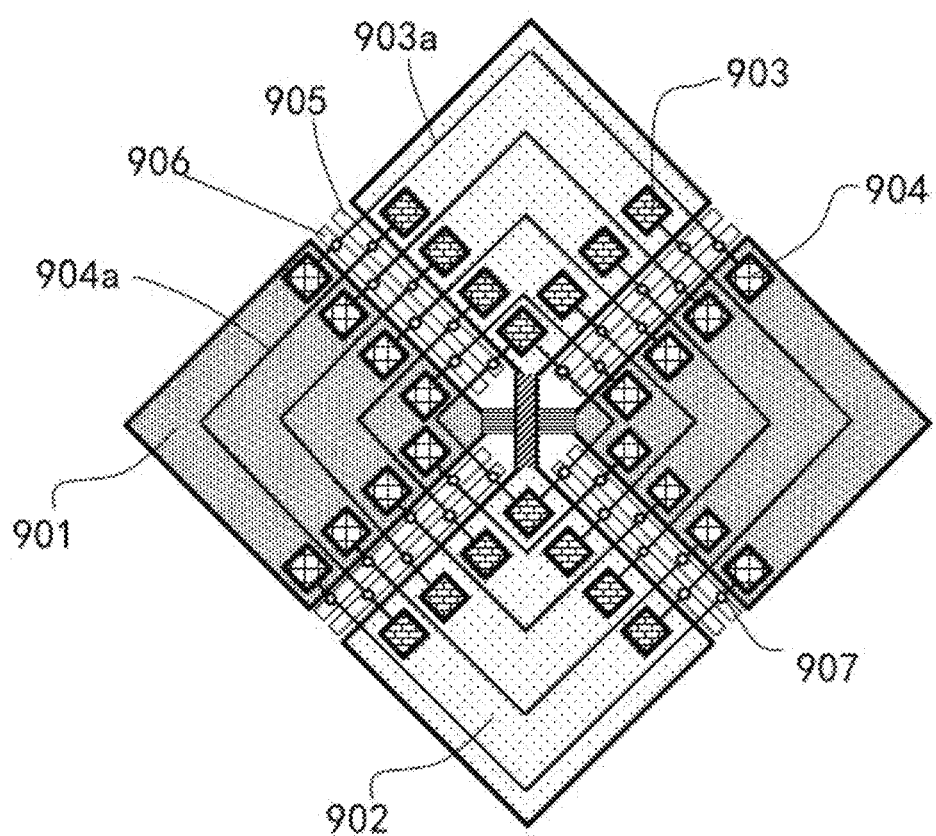
FIG. 9 is a schematic diagram of a touch electrode according to a sixth embodiment of the present disclosure.

As shown in FIG. 9, FIG. 9 is a schematic diagram of another touch electrode according to an embodiment of the disclosure, which shows at least one first touch electrode 901, at least one second touch electrode 902, a plurality of first split electrodes 904, a plurality of second split electrodes 903, a plurality of second suspension electrodes 905, a plurality of first suspension electrodes 906, a plurality of first connecting bridges 903a, a plurality of second connecting bridges 904a, and a plurality of nodes 907. Compared with the embodiment in FIG. 8, at this point, the first suspension electrode 906 and the second suspension electrode 905 disposed outside the border area are a single suspension electrode. In this way, the entire suspension electrode has a larger contact area than the split electrode, and the accuracy and sensitivity of the sensing will be different.

Figure 10:
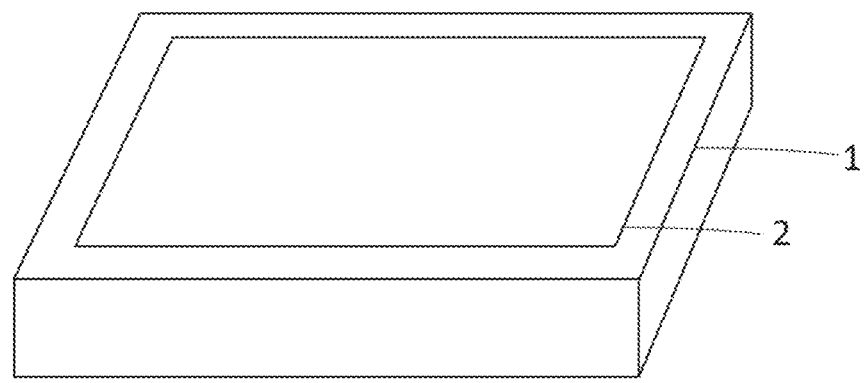
FIG. 10 is a schematic diagram of a display device according to an embodiment of the present disclosure.

The present disclosure also provides a display device, as shown in FIG. 10, which is a schematic diagram of a display device according to an embodiment of the present disclosure. The display device 1 includes the touch sensor 2 provided by the above-described embodiments of the present disclosure.

The touch sensor and the display device provided by the embodiments of the present disclosure are described in detail above. The description of the above embodiments is only for helping to understand the technical solutions of the present disclosure and its core ideas. It should be understood by those skilled in the art that the technical solutions described in the foregoing embodiments may be modified, and the modifications or substitutions do not deviate from the technical solutions of the embodiments of the present disclosure.

What is claimed is:

1. A touch sensor, comprising:
a plurality of first touch electrodes;
a plurality of second touch electrodes insulated from the plurality of first touch electrodes;
wherein the touch sensor further comprises at least one first suspension electrode disposed at a border area of each of the first touch electrodes where the first suspension electrode is coupled to one of the first touch electrodes to form a capacitor for sensing pressure,
at least one second suspension electrode disposed at a border area of each of the second touch electrodes, wherein the second suspension electrode is adjacent to the first suspension electrode and the second suspension electrode is coupled to one of the second touch electrodes to form a capacitor for sensing pressure,
wherein the touch sensor further comprises a first connecting bridge and a second connecting bridge, the first suspension electrode on the first touch electrode is connected to the first suspension electrode on the adjacent first touch electrode through the first connecting bridge; the adjacent first suspension electrodes are electrically connected through the first connecting bridge and the adjacent second suspension electrodes are electrically connected through the second connecting bridge.

2. The touch sensor according to claim 1, wherein each of the first touch electrodes is disposed along a first direction, each of the second touch electrodes is disposed along a second direction, the first direction and the second direction are different, and the second suspension electrode on the first touch electrode is connected to the second suspension electrode on the adjacent first touch electrode through the second connecting bridge.

3. The touch sensor according to claim 1, further comprises a first conductive bridge and a second conductive bridge, wherein the adjacent first touch electrodes are connected by the first conductive bridge, and the adjacent second touch electrodes are connected by the second conductive bridge, and the first conductive bridge and the second conductive bridge overlap each other to form an overlapping area.

4. The touch sensor according to claim 1, wherein material of the connecting bridge is metal.

5. The touch sensor according to claim 1, wherein an end of the first connecting bridge and an end of the second connecting bridge are T-shaped or Y-shaped.

6. The touch sensor according to claim 1, wherein the first suspension electrode comprises a plurality of first split electrodes, and the second suspension electrode comprises a plurality of second split electrodes.

7. A touch sensor, comprising:
a plurality of first touch electrodes;
a plurality of second touch electrodes insulated from the plurality of first touch electrodes;
wherein the touch sensor further comprises at least one first suspension electrode disposed at a border area of each of the first touch electrodes where the first suspension electrode is coupled to one of the first touch electrodes to form a capacitor for pressure sensing,
at least one second suspension electrode disposed at a border area of each of the second touch electrodes where the second suspension electrode is adjacent to the first suspension electrode and the second suspension electrode is coupled to one of the second touch electrodes to form a capacitor for pressure sensing, and
the adjacent first suspension electrodes are electrically connected through a first connecting bridge and the adjacent second suspension electrodes are electrically connected through a second connecting bridge.

8. The touch sensor according to claim 7, wherein each of the first touch electrodes is disposed along a first direction, each of the second touch electrodes is disposed along a second direction, and the first direction and the second direction are different.

9. The touch sensor according to claim 7, further comprises a first conductive bridge and a second conductive bridge, wherein the adjacent first touch electrodes are connected by the first conductive bridge, and the adjacent second touch electrodes are connected by the second conductive bridge, and the first conductive bridge and the second conductive bridge overlap each other to form an overlapping area.

10. The touch sensor according to claim 7, wherein the first suspension electrode on the first touch electrode is connected to the first suspension electrode on the adjacent first touch electrode through the first connecting bridge, and the second suspension electrode on the first touch electrode is connected to the second suspension electrode on the adjacent first touch electrode through the second connecting bridge.

11. The touch sensor according to claim 10, wherein an end of the first connecting bridge and an end of the second connecting bridge are T-shaped or Y-shaped.

12. The touch sensor according to claim 7, wherein the first suspension electrode comprises a plurality of first split electrodes, and the second suspension electrode comprises a plurality of second split electrodes.

13. The touch sensor according to claim 12, wherein the plurality of first split electrodes are disposed at a border area of each of the first touch electrodes, and the plurality of second split electrodes are disposed at a border area of the second touch electrode.

14. The touch sensor according to claim 13, wherein the plurality of first split electrodes coincide with the first suspension electrode in a top view, and the plurality of second split electrodes coincide with the second suspension electrode in a top view.

15. The touch sensor according to claim 13, wherein each of the first split electrodes of the border area of the first touch electrode is connected by the first connecting bridge.

16. The touch sensor according to claim 13, wherein each of the second split electrodes of the border area of the second touch electrode is connected by the second connecting bridge.

17. The touch sensor according to claim 7, further comprises at least one split electrode, and an area between each of the first touch electrodes and each of the second touch electrodes is provided with the split electrode.

18. The touch sensor according to claim 9, wherein the overlapping area has an insulating medium, and the first conductive bridge and the second conductive bridge are insulated.

19. The touch sensor according to claim 7, wherein material of the connecting bridge is metal.

20. A display device, comprising:
a plurality of first touch electrodes;
a plurality of second touch electrodes insulated from the plurality of first touch electrodes;
wherein a touch sensor further comprises at least one first suspension electrode disposed at a border area of each of the first touch electrodes where the first suspension electrode is coupled to one of the first touch electrodes to form a capacitor for pressure sensing,
at least one second suspension electrode disposed at a border area of each of the second touch electrodes where the second suspension electrode is adjacent to the first suspension electrode and the second suspension electrode is coupled to one of the second touch electrodes to form a capacitor for pressure sensing,
wherein the adjacent first suspension electrodes are electrically connected through a first connecting bridge and the adjacent second suspension electrodes are electrically connected through a second connecting bridge.

* * * * *